Oct. 23, 1945.    L. ANTONELLI ET AL    2,387,553
MILLING MACHINE FOR INGOTS
Filed Feb. 20, 1942    2 Sheets-Sheet 1
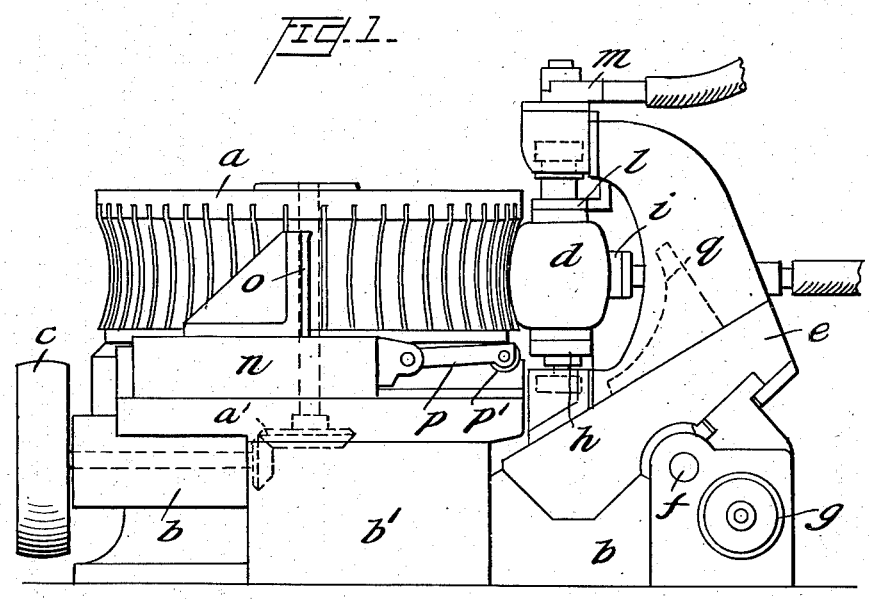
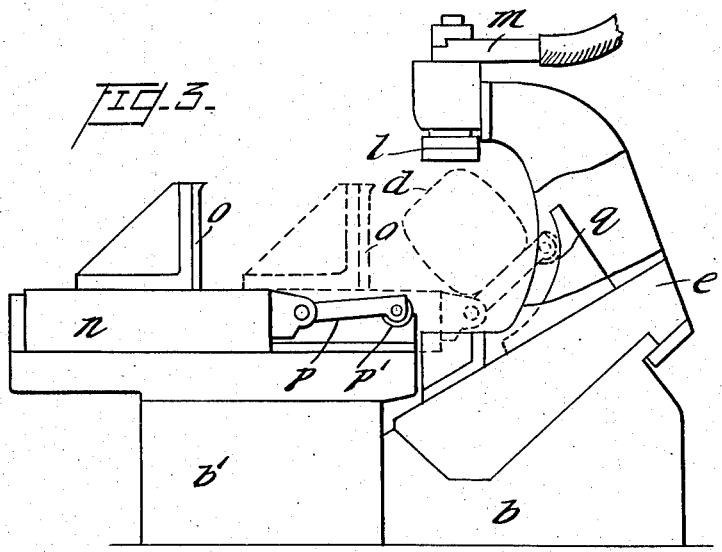
Inventors
L. Antonelli
O. Pavan,
By
Attorney.

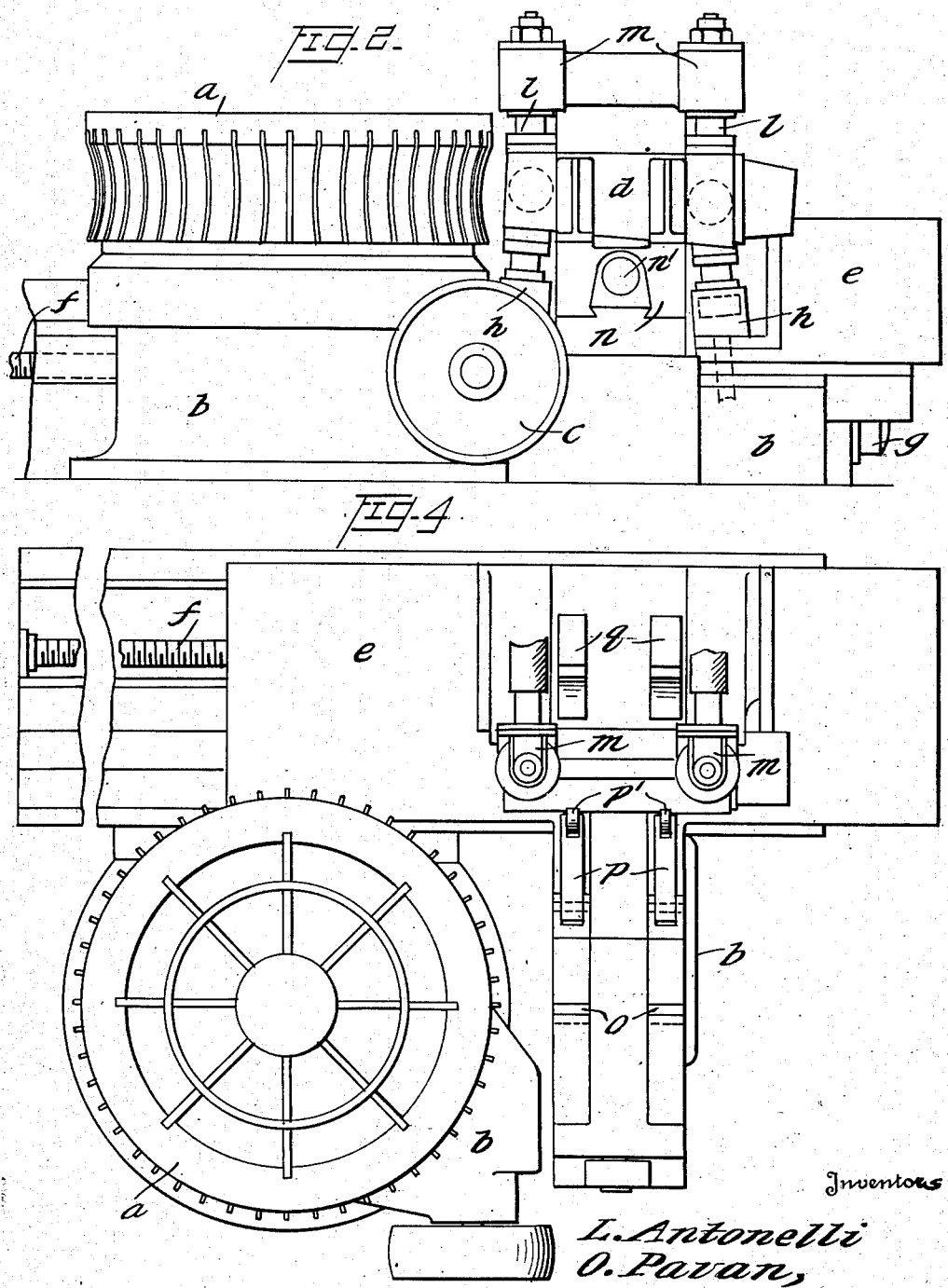

Patented Oct. 23, 1945

2,387,553

UNITED STATES PATENT OFFICE 2,387,553

MILLING MACHINE FOR INGOTS

Leonida Antonelli, Este, Padova, and Osvaldo Pavan, Imola, Italy; vested in the Alien Property Custodian Application February 20, 1942, Serial No. 431,768
In Italy January 2, 1941

2 Claims. (Cl. 90—19)

This invention relates to a milling machine particularly adapted to handle work of large dimensions.

The milling machine disclosed is particularly useful in removing slag and superficial irregularities from steel ingots. The ingots are handled directly from the molds and the operation is preferably handled while the ingots are at a temperature between 800° and 900°, it being obvious the higher the temperature the easier it is to make the desired cut.

Referring to the drawings:

Fig. 1 is an end elevation of the machine showing an ingot located in position to be operated upon by a suitable tool;

Fig. 2 is a front elevation of the machine;

Fig. 3 is a view similar to Fig. 1 showing the cycle of operation in turning the work;

Fig. 4 is a plan view of the machine.

The machine comprises a main frame having a base $b'$ with transmission housing sections $b$. Mounted on the base $b'$ is a suitable cutter $a$ having a vertical axis and driven through a suitable transmission $a'$ in one of the sections $b$ from pulley $c$. The pulley $c$ may be driven from any suitable source of power. The rotary cutter $a$ is preferably constructed with a body in which is mounted independent cutting blades of a contour to not only mill one side of an ingot but to extend about the corners along the side being milled. The cross sectional shape of the work is generally polygonal but of course may be cylindrical or other shape and the cutting blades may be accordingly designed.

The frame is provided with a V-guide along which work table $e$ may be reciprocated in a path having its direction tangential to the periphery of the cutter. The table $e$ is reciprocated through a suitable transmission from the drive $c$ in order to operate a screw $f$, or as shown in Fig. 1, the screw $f$ may have an independent drive from motor $g$. The speeds of the cutter and of the table are so controlled that efficiency may be had in accordance with the depth of cut to be made, the character of the metal being worked upon or any other predetermined factor.

Carried by the table $e$ are two sets of three hydraulic jacks $h$, $i$, $l$, each being remotely controlled by any suitable means so that the ingot or work $d$ may be properly located on the bed member $e$, the jacks $h$ and $l$ opposing each other to engage the top and bottom of the work, while the jack $i$ operates to oppose the cutter, the jack $i$ engaging the work face on one side of the work $d$, while the cutter operates on the opposing face. Mechanism $m$ may be provided to automatically coordinate the operation of the jacks for a definite positioning of the work as to the cutter. Due to the extreme heat under which the operation takes place, it is advisable that these jacks and their mechanism be remotely controlled not only for safety but for efficiency.

Means is also provided to turn the work while still on the machine. To this end there is provided a movable member $n$ slidable horizontally on the base $b'$ toward and from the work. The member $n$ may also be remotely controlled through screw $n'$ to advance toward the work following a loosening or release of the hydraulic jacks from locking position. The member $n$ carries arms $p$ pivoted thereto and carrying rollers $p'$ at their forward ends, which come into contact with arcuate cams $q$ when the arms $p$ are under the work. Continued travel of the member $n$ causes the arms $p$ to lift as guided through the medium of the cams $q$, thereby causing the work $d$ to be rolled or rotated in a direction toward the cutter (Fig. 3) to present another side to be operated upon. The member $n$ carries brackets $o$ which are advanced to close proximity of the work as the rolling or rotating operation takes place, and these brackets prevent the work from rotating beyond a desired degree, thus maintaining it in position to be again clamped by the jacks against the cutter $a$ and ready for a milling operation on another side. Of course this operation may be repeated on as many work faces as desired.

Two sets of hydraulic jacks are disclosed herein but any suitable number of sets can be used. Through the use of this type of clamping means a highly desirable adjustment and maintenance of adjustment is attained.

What is claimed and it is desired to secure by United States Letters Patent:

1. In a milling machine, the combination of a frame; a reciprocable work table slidable on said frame in the direction of the longitudinal axis of the work on the table; adjustable means for clamping the work on said table; a reciprocable carriage slidable on said frame in a direction at right angles to the said axis; a pair of arms pivoted on the end of said carriage toward said table, and each provided on its outer end with a roller; a pair of arcuate tracks on said table, the table and carriage being so constructed and related that the tracks can be brought into alignment with the arms respectively, by the travel of the table, and that when they are so aligned the carriage can be slid toward the table and cause said rollers to travel on their respective tracks, thereby causing the arms to rise under the work, the clamping means being released from the work, so that the work is turned about its said axis; and a rotary cutter rotatable about a vertical axis on said frame, the path of the table being tangential to the periphery of the cutter, and the path of travel of the carriage being on the same side of the table as the cutter.

2. In a milling machine, the combination of a frame; a cutter rotatable on said frame; a reciprocable work table slidable on said frame in a tangential path as to the periphery of the cutter; two adjustable co-axial clamps on said table adapted to bear against the bottom and top of the work respectively; a third adjustable clamp movable on an axis at right angles to the common axis of the two first mentioned clamps, and adapted to bear against the side of the work remote from the cutter; a carriage slidable on said frame in a path at right angles to the path of the table; a pair of parallel arms pivoted on the end of said carriage toward said table, and each provided on its outer end with a roller; and a pair of arcuate tracks on said table, the table and carriage being so constructed and related that the tracks can be brought into alignment with the arms respectively, by the travel of the table, and that when they are so aligned, the carriage can be slid toward the table and cause said rollers to travel on their respective tracks, thereby causing the arms to rise under the work, the three clamps being released from the work, so that the work is turned about its longitudinal axis.

LEONIDA ANTONELLI.
OSVALDO PAVAN.